Figure 1:
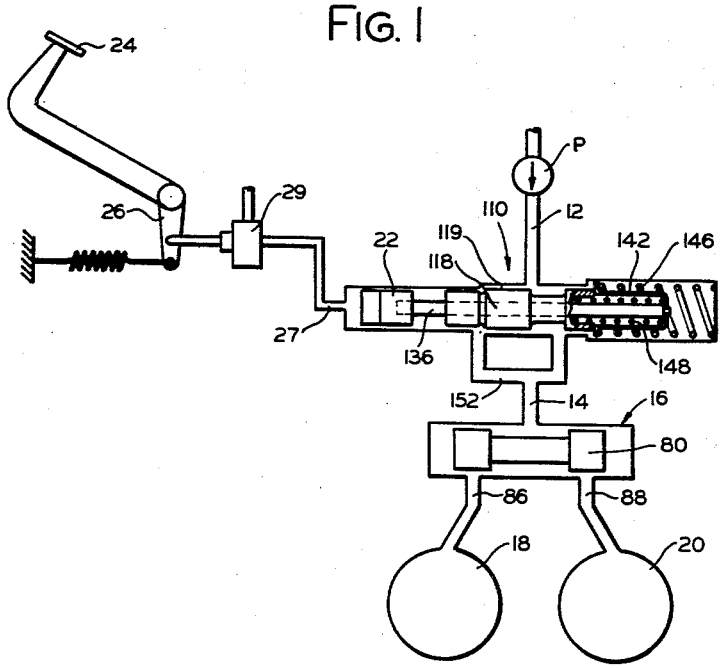

United States Patent Office 2,950,734
Patented Aug. 30, 1960

2,950,734

REGULATING VALVE

Woodrow A. Hasbany, South Bend, Ind., assignor to Clark Equipment Company, a corporation of Michigan Original application Nov. 10, 1958, Ser. No. 772,920. Divided and this application Nov. 23, 1959, Ser. No. 854,759

5 Claims. (Cl. 137—495)

This invention relates to improvements in valve means for use in fluid operated control systems. More particularly, the valve means of this invention is constructed to control and regulate fluid pressures, and it may be disposed, for example, between a source of pressurized fluid and a device operated thereby such as a transmission clutch.

This is a division of application Serial No. 772,920, filed November 10, 1958.

Briefly, this invention constitutes an improvement in so-called "inching" control valve mechanisms. Such control valve mechanisms may be used in regulating pressure to a fluid operated clutch of the type found in industrial lift trucks and other machines. Specifically, such a control valve means is frequently constructed to permit an immediate relief of a portion of the clutch application pressure followed by regulated decrease or increase in the pressure of fluid supplied to a fluid operated clutch whereby the latter may be gradually disengaged or engaged by the operator. One particular use of this type of regulating valve, as mentioned, contemplates the control of a fluid pressure actuated clutch for the transmission of an industrial lift truck. In such a vehicle, it is often necessary to hold the truck stationary while the lift fork or like material engaging device is operated at a speed corresponding to full engine speed without shifting the transmission to neutral position. It is desirable in such circumstances to be able to "inch" the vehicle forwardly or reversely, as desired, to make possible its accurate positioning and the handling of material.

Conventionally, the vehicle transmission has been kept in gear and the brakes of the vehicle have been employed to control "inching" of the vehicle. This method of control is undesirable because it requires considerable pressure to be applied to the brake pedal by the operator of the vehicle and also causes undesirable wear of the brake linings.

Various control and regulating valves for performing the above stated function in conjunction with power shifted transmissions employing fluid pressure actuated transmission clutches have been disclosed previously as exemplified by U.S. Patents No. 2,786,368, dated March 26, 1957, and 2,814,371, dated November 26, 1957.

In order to carry out the above mentioned "inching" feature, valve means, such as described in the above identified patents have been provided to effect improved gradual engagement and disengagement of the vehicle clutch, after relief of excess pressures in the system, by operating such valve means in conjunction with the application and release of the vehicle brake system. The operation of such valve means may be either hydraulic by application of fluid pressure in the brake system, or mechanical by means of a linkage connection with the brake pedal of the vehicle. In such structures when the brakes are actuated the valve means shifts to a position interrupting fluid flow to a clutch control valve and effects controlled partial deactuation of the clutch means thus providing control of the torque to the wheels of the vehicle. When the brake pedal is released, the valve means is returned to its normal position reestablishing communication between the clutch control valve and the source of fluid under pressure. As a result of the above arrangement, drive between the input and output shafts of the vehicle transmission may be controlled to permit "inching" of the vehicle without interfering with the operations of raising and lowering a load.

The valve means of the present invention constitutes an improvement upon the structures of the above identified patents and may be generally characterized as an improved arrangement of a spool type valve having a suitable porting system and a novel arrangement of opposing spring means therein, so as to provide an accurate, but rugged valve means capable of relieving overpressures to gain a workable pressure which is thereafter regulated to control a transmission clutch of a vehicle such that the pressure of the clutch, or other controlled device, is balanced against a spring in order to regulate the clutch pressure automatically at a value responsive to the position of the brake pedal or other controlling device.

With the foregoing in mind, it is a primary object of the present invention to provide new and improved regulating valve means having pressure relief and regulating features for use in fluid operated control systems.

Another object of the present invention is to provide a new and improved inching valve for use in industrial lift trucks and having fluid pressure actuated transmission clutch to the end that the vehicle's clutch mechanism may be gradually engaged or disengaged at the will of the operator by operating the vehicle's brake system.

Still another object of the present invention is to provide a new and improved inching valve means for industrial lift trucks and like vehicles which is universally adaptable for either hydraulic or mechanical operation at the manipulation of a foot pedal associated with the vehicle's brake system.

A still further object of the present invention is to provide a new and improved inching valve means for controlling the fluid pressure to a clutch mechanism in a vehicle, for initially relieving excess pressure on the clutch and then balancing the actuating pressure of the clutch against a spring to thereby regulate the clutch pressure automatically at a value responsive to the position of the vehicle brake pedal or other controlling device.

A still further object of the present invention is to provide a new and improved regulating valve for controlling the fluid pressure to a fluid actuated clutch mechanism of a vehicle, having a minimum number of parts, which is of simple and rugged construction, is efficient and reliable in operation, and is inexpensive to manufacture.

Figure 2:
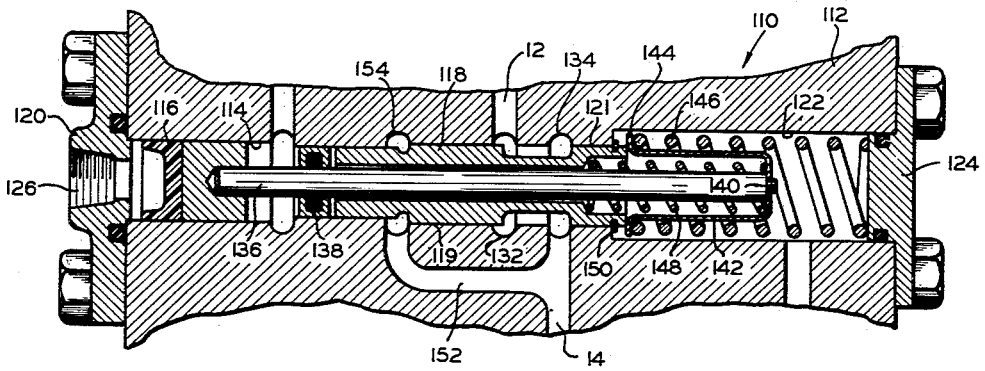

The above and other objects, features and advantages of the present invention will be apparent to those familiar with the art from the following detailed description of a preferred embodiment thereof as shown in the accompanying drawing forming a part hereof and wherein:

Figure 1 is a schematic representation of a typical fluid system in which the improved valve of the present invention finds utility; while Figure 2 is a longitudinal cross-sectional view of an actual valve structure for use in a fluid system as shown Figure 1.

As seen in Figure 1, the new and improved regulating valve 110 of the present invention is employed in a fluid circuit of an industrial lift truck. Valve 110 serves to control the pressure of fluid supplied by way of inlet 12 from the pump P which may be driven by the engine of the vehicle, to a conduit 14 leading to a clutch direction selector 16. Selector 16 controls the actuation of reverse and forward fluid pressure actuated clutches 18 and 20 respectively, in the vehicle's transmission. Valve 110 includes a piston 22 which is shiftable in response to actuation of the brake pedal of the vehicle indicated at 24. Brake pedal 24 is connected with piston 22 by a suitable linkage system indicated generally at 26. The piston 22 is actuated by hydraulic means, in this instance by conducting fluid thereto by means of a conduit connection 27 with the master cylinder 29 of the vehicle's braking system as will appear hereinafter in connection with the description of a specific preferred embodiment of the invention.

Rightward movement of the piston 22 is transmitted by means of a rod 136 to a spring seat member 142 which moves toward the right against the opposition of the bias of a compression spring 146. This results in the elongation of another compression spring 148 located between the spring retainer and a spool member 118 which frees the spool 118 of a portion of the force exerted thereon by the spring 148. During operation the spool 118 has fluid pressure exerted on the left end thereof tending to move it toward the right, and such force shifts spool 118 along rod 136 to the right when the force is partially relieved on spring 148. As the spool 118 shifts toward the right, the center land portion 119 thereon gradually closes off conduit 12 and restricts the flow of fluid from the pressure source to the vehicle clutch. Sufficient movement of the spool 118 to the right causes the fluid from the pressure force to be cut off entirely but an intermediate movement of the spool 118 causes a regulating action which provides controlled restriction of fluid flow from the pump P to the vehicle clutch.

Under normal operating conditions of the vehicle, that is, with the brakes released, pressurized fluid from the inlet 12 flows at full supply pressure through the regulating valve 110 and thence into the conduit 14 whereby it is delivered to direction selector means 16 which controls operation of the fluid clutch mechanisms 18 and 20 of the vehicle. Such direction selector means includes a double acting valve spool 80 herein disposed transversely of the direction selector means. Positioning of spool 80 is in response to actuation of a selector control lever (not shown) available to the vehicle's operator. The positioning of the selector spool 80 serves to control the passage of pressurized fluid to conduits 86 or 88 thus to control the operation of forward or reverse transmission direction clutches 18 and 20. In this regard, note that the spool 80 has three positions of operation, neutral as shown in Figure 1, or to either side of the neutral position to selectively admit pressurized fluid to either of the two direction clutches 18 or 20.

Next, reference is made to Figure 2 for more detailed showing of the invention. The valve 110 includes a body portion 112 having an internal stepped bore or chamber 114 in which a piston 116 and a spool 118 are mounted for axial sliding movement. The left end of the bore 114 is suitably sealed by means of a closure element 120. The opposite end of the body portion 112 is provided with a slightly enlarged internal bore 122 which is concentric with bore 114 and is suitably sealed by means of a closure element 124. The closure element 120 is provided with an aperture 126 for connection with the conduit 27 (see Figure 1) of the vehicle's brake system for directing fluid under pressure into the bore 114 at the left side of the piston 116. The body portion 112 is provided with a lateral bore or passage 12 (the same as shown in Figure 1) which serves as the inlet conduit means for directing fluid under pressure from the pump P to the bore 114. The lateral bore or passage 14 for directing the fluid under pressure from the bore 114 to the direction selector means 16 also appears in Figure 2 the same as in Figure 1. The passages 12 and 14 communicate with the bore 114 by way of annular grooves 132 and 134, respectively.

The piston 116 has rigidly secured thereto an elongated rod 136 which passes through a suitable sealing element 138 which divides the bore 114 into two separate chambers. The rod 138 also passes freely through the center of spool 118 and terminates at its free end in a shoulder portion 140. Suitably mounted upon the shoulder 140 is the partially closed right end of a generally cylindrical sleeve element or spring retainer 142 which also has a radially extending flange 144 adjacent the left end adapted and arranged to engage a compression spring 146. The opposite end of spring 146 bears against cover plate 124. Mounted internally of the sleeve element 142 and surrounding the rod 136 is a second compression spring 148 which bears against the end wall of the sleeve element at the right end and against the spool 118 at the opposite end thereof.

Normally, the above described elements of the valve 110 are positioned substantially as viewed in Figure 2 of the drawing. The spool 118 is at its extreme left position and is prevented from additional movement toward the left by means of an annular snap ring 150 or other stop means. Movement of the spool 118 toward the right is opposed by the combined action of the two compression springs 146 and 148. The pressurized fluid from the pump is delivered under substantially unrestricted conditions through the bore 12 to the bore 14 and into the clutch direction selector means 16 for actuation of either the forward or reverse clutches, as desired, depending upon the operating position of the selector means. The pressure of the fluid in bore 14 is also directed by means of an equalizing passageway 152 and an annular groove 154 against the left end of the central land portion 119 on the spool 118 such that, as may be seen, the spool 118 is subjected to an unbalancing force tending to urge it toward the right which is counteracted by the compression springs 146 and 148. It will be observed that pressure exerted on spool 118 by pressurized fluid entering at passage 12 provides an axial balance of forces on spool 118, because the area of the right end of land portion 119 equals the area of the left end of land portion 121 and thus the resulting axial forces are equal and opposite.

If now the operator depresses the brake pedal 24, the linkage means 26 is actuated in a manner such that fluid under pressure from the vehicle's braking system is caused to be admitted to the bore 114 at the left hand side of piston 116 by way of the aperture 126 in the closure element 120. The pressure at which fluid is thus admitted is in proportion to the degree of depression of the brake pedal 24. The brake fluid under pressure thus urges the piston 116 toward the right and the rod 136 thus imparts a corresponding degree of movement to the sleeve element 142 against the bias of compression spring 146. The compression spring 148 is elongated slightly and the spool 118 thus is freed of a portion of the force normally exerted thereon by the compression spring 148. It should be noted that the springs 146 and 148 are of unequal strength and spring value with the spring 146 normally exerting the greater compressive force. Since, as above mentioned, the spool 118 is normally hydraulically unbalanced toward the right, it will tend to shift along with the rod 136 and sleeve element 142. As the spool 118 shifts toward the right, the center land 119 thereon gradually restricts the flow of fluid from the pressure source to the vehicle clutch. Sufficient movement of the spool 118 to the right causes the fluid from the pressure source to be cut off entirely. The sleeve member 142 in moving toward the right under the influence of the movement of piston 116 will separate from the spool 118 and a regulating action then occurs which provides controlled restriction of the fluid flow from conduit 128 past the right end of land portion 119 into conduit 14. The regulation occurs between the lighter spring 148 within the sleeve member 142 and the clutch pressure which is applied adjacent at the left end of land portion 119 by way of the equalizing passageway 152 and annular groove 154. The action of this structure is that as the brake pressure is increased the clutch pressure is decreased until ultimately the brake is fully on and the clutch is fully disengaged. Conversely, release of the brake pedal allows the piston 116 and the rod 136 together with spool 118 to move to the left under the urging of the compression springs 146 and 148 to thereby fully open the circuit from the pump to the clutch so that the latter is fully engaged. Thus merely by depressing the brake pedal a regulating action is automatically brought about which is highly sensitive and is responsive to the degree of brake application to thereby regulate the supply of fluid to the clutches whereby the "inching" operation may be readily effected.

From the foregoing description of the operation of the new and improved valve means 110, it will be realized that the present structure provides an effective and simple means for "inching" an industrial lift truck. The operator merely depresses the brake pedal and a regulating action occurs which is highly sensitive and responsive to the degree of brake application to thereby regulate the supply of fluid to the clutch whereby the "inching" operation may be readily effected. It will be appreciated that there is ordinarily a continuous flow of pressurized fluid to the clutch in an apparatus of this type, to make up for leakage and sometimes because of a bleed hole in the clutch chamber which remains open; thus it is possible to regulate the clutch application pressure by regulating the flow of fluid to the clutch.

While there has been described and illustrated herein an embodiment of the invention adapted for hydraulic operation by fluid under pressure from the vehicle's brake system, it will be apparent to those skilled in the art that it would be possible, if desired, to adapt this regulating valve for operation by means of a mechanical linkage connection between the brake pedal of the vehicle and rod 136.

From the foregoing, it is believed that the concept and features of the present invention will be clearly understood by those familiar with the art. While the invention has been disclosed and described by way of reference to a certain preferred embodiment thereof, it is obvious that numerous changes, modifications and substitutions of equivalents may be made therein without departing from the spirit and scope of the invention. As a consequence, it is not intended that the invention shall be limited to the specific form described and disclosed herein nor otherwise than by the terms of the appended claims.

I claim:

1. A regulating valve of the character described, said valve comprising a valve body having a longitudinal cylindrical bore therein, a pressure inlet and a pressure outlet communicating with said bore, a piston in said valve body having an elongated operating rod extending into said bore, means for moving said piston, a valve spool slidably arranged within said bore for restricting the flow of pressure fluid between said inlet and said outlet, said valve spool being concentric with and freely slidable relative to said operating rod, a sleeve member carried by one end of said operating rod in juxtaposition to said valve spool, a return spring within said bore and engaging said sleeve member and adapted and arranged to normally bias said piston and said valve spool to a position providing substantially unrestricted flow of pressure fluid from said inlet to said outlet, said valve spool being substantially hydraulically balanced with respect to the fluid pressure at said inlet, regulating passage means in said body communicating with said bore and with said outlet and adapted and arranged to hydraulically unbalance said valve spool in response to the pressure existing at said outlet, and regulating spring means surrounding said operating rod between said sleeve member and said valve spool and adapted and arranged to bias said valve spool in opposition to the hydraulic unbalance thereof, whereby upon operating movement of said piston, said sleeve member moves to compress said return spring and said valve spool performs a pressure regulating action between said inlet and outlet under the influence of said regulating spring responsively to the pressure existing at said outlet.

2. A pressure regulating valve comprising a valve body portion having a longitudinal cylindrical bore therein, a pressure inlet communicating with said bore, a pressure outlet communicating with the said bore at a location adjacent the pressure inlet, a regulating valve spool in said bore which is substantially hydraulically balanced relative to the pressure at said inlet, said spool having a longitudinal opening therethrough, a piston element in said valve body having an elongated rod connected thereto and extending into said bore, means for moving said piston, said rod passing axially through the said opening in the said valve spool whereby the spool is freely slidable within the bore relative to said rod, a cylindrical sleeve member located in the said bore, said sleeve member having one end at least partially closed and an outwardly extending flange portion at the opposite end, the said sleeve member being located in the said bore in a manner such that the flange portion thereof normally abuts one end of the said valve spool, a return spring engaging the said flange portion of the sleeve and normally urging said spool to a position to provide substantially unrestricted flow of pressure fluid between said inlet and said outlet, a regulating passage providing communication between said oultet and said bore at a different location than the aforementioned location adjacent the pressure inlet and adapted and arranged to hydraulically unbalance said valve spool in response to the pressure existing in said outlet, and regulating spring means surrounding said rod and located between the closed end of said sleeve member and said valve spool, whereby upon movement of said operating rod by said piston said sleeve member moves to allow said valve spool to shift under the hydraulic unbalance thereof to partially cut off the flow of pressure fluid between said inlet and said outlet, said regulating spring thereafter being effective to regulate the outlet pressure responsively to the position of the said piston element.

3. A pressure regulating valve mechanism comprising a body portion having an elongated chamber therein, a fluid inlet passage communicating with the said chamber at a first location, a fluid outlet passage communicating with the said chamber at a second location, a spool member slidably disposed in the said chamber and adapted to provide substantially unrestricted communication between said inlet and outlet passages in one position of the said spool member and to provide variable restriction of communication between said inlet and outlet passages in other positions, a regulating passageway providing communication between the said outlet passage and the said chamber at a third location, the said regulating passageway being adapted for admitting fluid at outlet pressure to the said chamber for exerting an axial force on the said spool proportional to the said outlet pressure, the said spool having a longitudinal opening therethrough, a rod member slidably positioned in the said opening, a spring seat member positioned at one end of the said rod, a closure member for the said chamber at one end thereof, a return spring positioned between the said closure member and the said spring seat member, a regulating spring located between the said spring seat member and the said spool member, and means for operating the said rod to compress the said return spring and vary the force exerted by the said regulating spring on the said spool member thereby to regulate the said outlet pressure by varying the restriction of communication between the said inlet and outlet passages.

4. A pressure regulating valve mechanism comprising a body portion having an elongated chamber therein, a fluid inlet passage communicating with the said chamber at a first location, a fluid outlet passage communicating with the said chamber at a second location adjacent the said first location, a spool member arranged to slide in the said chamber and provide unrestricted communication between the said inlet and outlet passages at one position of the said spool member and to provide variable restriction of communication between the inlet and outlet passages in other positions of the said spool member, a spring seat member in the said chamber, a spring retainer at one end of the said chamber, a return spring positioned between the said spring retainer and the said spring seat member, a regulating spring located between the said spring seat member and the said spool member, a regulating passageway providing communications between the said outlet passage and the said chamber at a third location, the said regulating passage being arranged for admitting fluid at outlet pressure to the said chamber for exerting an axial force on said spool member proportional to the said outlet pressure in opposition to the said regulating spring, and means for moving the said spring seat member to compress the said return spring and reduce the force exerted by the said regulating spring on the said spool member thereby to regulate the outlet pressure by varying the restriction of communication between the said inlet and outlet passages.

5. A regulating valve of the character described, said valve comprising a valve body, said valve body having a longitudinal cylindrical bore therein, a pressure inlet and a pressure outlet communicating with said bore, a valve spool in said bore for controlling the flow of pressure fluid between said inlet and said outlet and provide unrestricted communication between the said inlet and outlet passages in one position of the said spool member and to provide variable restriction of communication between the inlet and outlet passages in other positions of the said spool member, the said spool member having a longitudinal opening therethrough, a spring seat member located in the said chamber and one end of the said spool member and arranged to abut the spool member under certain conditions, a spring retainer at the end of the chamber adjacent the said spring seat member, a coiled return spring positioned in compression between the said retainer and the said spring seat member and a portion of the said return spring encircling the spring seat member, a coiled regulating spring acting in compression located between the said spring seat member internally thereof and the said spool member, a regulating passageway providing communication between the said outlet passage and the said chamber at a third location adjacent the other end of the chamber, the said regulating passage being arranged for admitting fluid at outlet pressure to the said chamber for exerting an axial force on the said spool member proportional to the outlet pressure in opposition to the said regulating spring, and means for moving the said spring seat member to compress the said return spring and reduce the force exerted by the said regulating spring on the said spool member thereby separating the said spring seat member from the said spool member and regulating the said outlet pressure by varying the restriction of communication between the said inlet and outlet passages responsively to the balance between the axial force exerted on said spool member by said fluid and the opposing regulating spring pressure, the said means for moving the said spring seat member comprising a piston slidable in the said chamber and a rod extending between the piston and the said spring seat member through the said opening in the said spool member and through the said regulating spring.

No references cited.